(12) United States Patent
Walter

(10) Patent No.: US 6,862,519 B2
(45) Date of Patent: Mar. 1, 2005

(54) AIRPORT MAP SYSTEM WITH COMPACT FEATURE DATA STORAGE

(75) Inventor: Randy L. Walter, Ada, MI (US)

(73) Assignee: Smiths Aerospace, Inc., Grand Rapids, MI (US)

(*) Notice: Subject to any disclaimer, the term of this patent is extended or adjusted under 35 U.S.C. 154(b) by 4 days.

(21) Appl. No.: 10/079,204

(22) Filed: Feb. 20, 2002

(65) Prior Publication Data

US 2003/0105580 A1 Jun. 5, 2003

Related U.S. Application Data

(60) Provisional application No. 60/336,752, filed on Dec. 4, 2001, provisional application No. 60/337,182, filed on Dec. 4, 2001, provisional application No. 60/337,192, filed on Dec. 4, 2001, and provisional application No. 60/337,295, filed on Dec. 4, 2001.

(51) Int. Cl.$^7$ ............................................. G01S 13/56
(52) U.S. Cl. ....................... 701/120; 340/963; 340/972; 340/951; 342/36; 342/450; 244/114 R
(58) Field of Search .................... 342/456, 29, 457, 342/36, 37, 450, 454; 244/114 R; 701/9, 16, 120, 301, 208, 213; 340/963, 945, 961, 972, 947, 958, 951, 970; 345/619; 455/66, 431

(56) References Cited

U.S. PATENT DOCUMENTS

| | | | |
|---|---|---|---|
| 3,706,969 A | 12/1972 | Paredes | 340/26 |
| 3,971,025 A * | 7/1976 | Levine | 343/108 R |
| 4,151,595 A | 4/1979 | Pressiat | 364/439 |
| 4,516,125 A * | 5/1985 | Schwab et al. | 342/36 |
| 4,845,629 A * | 7/1989 | Murga | 701/120 |
| 4,876,651 A * | 10/1989 | Dawson et al. | 340/995 |
| 5,057,835 A | 10/1991 | Factor et al. | 340/995 |
| 5,200,902 A | 4/1993 | Pilley | 364/439 |
| 5,268,698 A | 12/1993 | Smith, Sr. et al. | 342/450 |
| 5,343,395 A * | 8/1994 | Watts | 340/951 |
| 5,374,932 A * | 12/1994 | Wyschogrod et al. | 342/36 |
| 5,519,618 A * | 5/1996 | Kastner et al. | 364/461 |
| 5,629,691 A * | 5/1997 | Jain | 340/961 |
| 5,745,054 A | 4/1998 | Wilkens | 340/972 |
| 5,831,570 A | 11/1998 | Ammar et al. | 342/26 |
| 5,913,912 A | 6/1999 | Nishimura et al. | 701/35 |
| 5,978,715 A | 11/1999 | Briffe et al. | 701/11 |
| 6,018,698 A | 1/2000 | Nicosia et al. | 701/214 |
| 6,112,141 A | 8/2000 | Briffe et al. | 701/14 |
| 6,144,915 A * | 11/2000 | Shiomi et al. | 701/120 |
| 6,157,876 A * | 12/2000 | Tarleton et al. | 701/16 |
| 6,195,609 B1 | 2/2001 | Pilley et al. | 701/120 |
| 6,246,342 B1 * | 6/2001 | Vandevoorde et al. | 340/961 |
| 6,282,488 B1 | 8/2001 | Castor et al. | 701/120 |
| 6,314,363 B1 * | 11/2001 | Pilley et al. | 701/120 |
| 6,314,370 B1 * | 11/2001 | Curtright | 701/213 |
| 6,353,794 B1 | 3/2002 | Davis et al. | 701/201 |
| 6,411,890 B1 | 6/2002 | Zimmerman | 701/120 |
| 6,453,231 B1 * | 9/2002 | Ooga | 701/120 |
| 6,463,383 B1 | 10/2002 | Baiada et al. | 701/120 |
| 6,591,170 B2 * | 7/2003 | Block et al. | 701/9 |
| 2001/0049580 A1 * | 12/2001 | Kusano et al. | 701/200 |
| 2002/0042673 A1 * | 4/2002 | Ooga | 701/120 |

* cited by examiner

*Primary Examiner*—Thomas G. Black
*Assistant Examiner*—Tuan C To
(74) *Attorney, Agent, or Firm*—Price, Heneveld, Cooper, DeWitt & Litton, LLP

(57) ABSTRACT

An airport map display system for an aircraft displays the airport paved surfaces and structures to a pilot or crew member. The system displays runways, taxiways, connectors, ramps, gates, and buildings. Hold and yield points may also be displayed. A compact set of specific data points and associated pavement width values is used to store unique data for each airport.

22 Claims, 3 Drawing Sheets

AIRPORT MAP SYSTEM WITH COMPACT FEATURE DATA STORAGE

CROSS-REFERENCE TO RELATED APPLICATIONS

This application claims the benefit of U.S. Provisional Application Nos. 60/336,752; 60/337,182; 60/337,192; and 60/337,295, all filed Dec. 4, 2001, the disclosure of each of which is incorporated by reference.

BACKGROUND OF THE INVENTION

1. Field of the Invention

The present invention relates to aircraft surface guidance systems (SGS) and, in particular, to a method to format and store data regarding the paved surfaces, gates, and buildings of an airport and to display a map of the airport to the pilot.

2. Technical Background

There is considerable interest in enhancing the field of surface guidance for aircraft. After an aircraft lands at an airport the next step is to taxi the aircraft to a desired destination such as a passenger loading/unloading gate. A pilot can become confused or lost amid the many runways, taxiways, ramps, and buildings. The problem is more significant at large airports and is particularly significant at night or in low visibility conditions when the multitude of lights can make it more difficult to taxi to the desired destination.

Efficient taxi operations save time and money. Airports are becoming more crowded. Aircraft often spend considerable time taxiing between runways and gates. Taxi time is even longer if a pilot makes a wrong turn, becomes lost, or blunders onto the wrong runway or taxiway. In addition, a wrong turn or navigation blunder can cause delays for other aircraft at the airport.

A main feature of an airport surface guidance capability is the presentation of an airport map that is readily available to the pilot. One way to present such a map is on a head-down display (HDD) that is in the forward field of view of the pilot. The pilot identifies the aircraft's current position of the aircraft on the map and the destination location and is able to quickly understand the approved taxi route provided by ground controllers. The airport map may also indicate the current aircraft position and a selected taxi route overlaid on the airport map. The map gives a pilot situational awareness of the aircraft's position relative to the destination and the taxi instructions.

An obstacle for the practical implementation of an avionics systems to aid the pilot in finding his way safely to the active takeoff runway or, conversely, to the gate after landing, is the requirement to clearly display an airport map, preferably with taxi instructions and current aircraft position overlaid on the map. Prior avionics systems have attempted to display airport maps by storing the airport map as a digital picture. While this approach works, representation of the airport map in this manner requires large amounts of memory for each airport. An airport map of a single airport can consume more than one gigabyte of memory. This requirement, coupled with the fact many avionics systems have limited data storage capability, have stymied efforts to implement airport maps on many aircraft. Another approach for displaying airport maps has been to upgrade aircraft avionics systems with new equipment that has large data storage capability. However, these systems must be designed, certified, integrated with the existing avionics suite, and installed. All this makes such an upgrade very costly and, therefore, this approach is economically infeasible for many aircraft.

It is generally desirable for an aircraft taxi planning and map system not only to accomplish the tasks of storing and displaying airport maps, but to also make the implementation cost-effective. The continuing goal, therefore, is to find ways to reduce costs, reduce taxi errors, save taxi time, and improve airport efficiency.

SUMMARY OF THE INVENTION

To address the goals stated above and other goals, the inventive airport map system includes a unique data storage method and structure that reduces the storage space required to represent an airport and also makes the map data easily accessible. The data base is also useful for taxi planning purposes.

According to one embodiment, the airport map system is integrated into the flight management system (FMS) which provides the enroute planning function for the aircraft. The FMS comprises all of the components required to implement the airport map system including a user interface, processor, data storage devices, and communications links to a display screen such as a HDD.

One aspect of the airport map system is the selection of data used to represent airport features. Airport features, such as runways and taxiways, are represented by two location points that define the centerline. In addition, the runway or taxiway width is saved and therefore the edge of the runways and taxiways are defined. Similarly, connectors are efficiently represented with two points and a width. Arc transitions between surfaces are represented by two points, a width and radius of the arc. Other airport features are represented in memory efficient formats. Airport features such as terminal buildings and ramp areas are represented by a sequence of location points that represent the perimeter of the feature. Likewise, gates are represented by a single location point and a desired aircraft heading. The location points are either latitude and longitude coordinates or similar position determining values.

Another aspect of the airport map system is a linked list data structure by which the airport data is stored for efficient retrieval. The invention may use the linked list that is also flexible for storing airport data for various airport configurations. In addition, the database can be updated frequently without the need to alter program software. More preferably, the invention may use a linked list comprising two data tables as described below.

It is clear that the invention is a significant improvement over the prior art. Further, those skilled in the art should recognize that the airport map system of the present invention is not limited to use with an FMS. Other processor, display screens, and data entry devices may also be used to practice the airport map system.

Additional features and advantages of the invention will be set forth in the detailed description which follows, and in part will be readily apparent to those skilled in the art from that description or recognized by practicing the invention as described in the detailed description which follows, the claims, as well as the appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

DETAILED DESCRIPTION OF THE PREFERRED EMBODIMENTS

Figure 1:
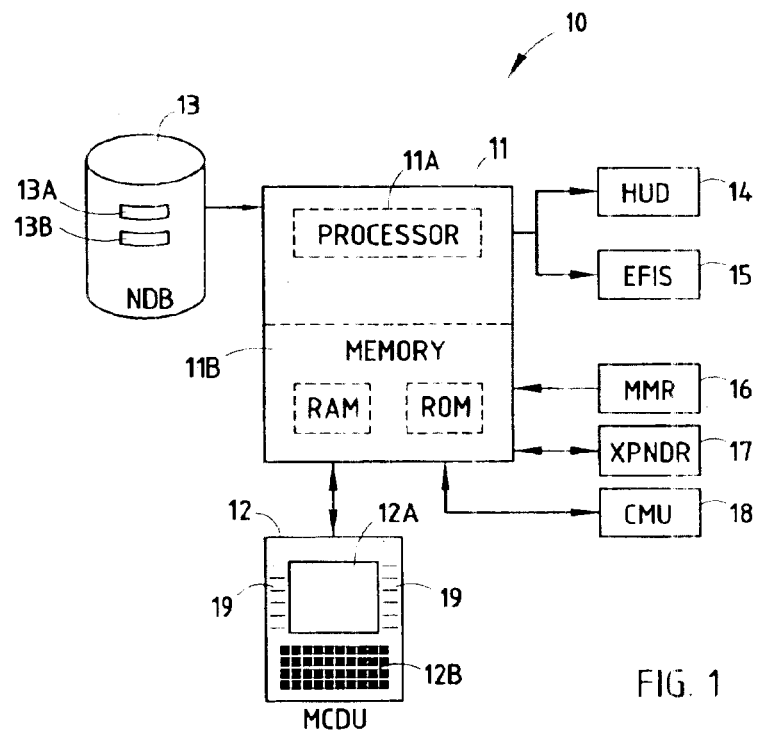
FIG. 1 is a block diagram of one embodiment of the airport map system according to the invention.

Reference will now be made in detail to the present preferred embodiments of the invention, examples of which are illustrated in the accompanying drawings. Wherever possible, the same reference numerals will be used throughout the drawings to refer to the same or like parts.

Referring to FIG. 1, an exemplary embodiment of the taxi planning system according to the present invention is shown, and is designated generally throughout by reference numeral 10. The components of the taxi planning system of the present invention will first be briefly described and then described in detail. The most common use for the taxi planning system 10 is as an integrated element in the FMS of an aircraft, such as a commercial passenger or cargo jet, and therefore the following discussion will describe the invention in relation to such an application.

The taxi planning system 10 according to the invention is shown with related aircraft systems. Any and all of the aircraft systems can comprise the taxi planning system of the invention, and therefore they are collectively referred to as taxi planning system 10. Taxi planning system 10 comprises flight management computer (FMC) 11, multifunction control display unit (MCDU)12, navigation database (NDB) 13, head-up display (HUD) 14, electronic flight instrument system (EFIS) 15, multi-mode receiver (MMR) 16, transponder 17, and communications management unit (CMU) 18. FMC 11 and MCDU 12 are generally referred to as a flight management system (FMS).

FMC 11 comprises a processor 11A, and memory 11B. Processor 11A may include any data processor suitable for receiving and processing commands and data. Processor 11A is preferably a microprocessor with sufficient throughput to complete the required FMS and taxi planning tasks in real-time. Memory 11B preferably comprises both random access memory (RAM) for storing dynamic data and variables, and read-only memory (ROM) for storing program data and static data. Processor 11A communicates with memory 11B to retrieve program instructions and data and to manipulate and store variables. Processor 11C is also in communication with NDB 13.

NDB 13 comprises airport data describing airport runways, taxiways, gates, ramps, and various other airport structures as desired. The airport data is stored in the linked list 13A and standard taxi routes 13B are also preferably stored in the database. NDB 13 is preferably rewritable or replaceable so that the airport data is easily updated as needed and so that the data remains current regarding changes to airport runways, taxiways, and the like. NDB 13 is constructed of any of various memory storage technologies such as PROM, EPROM, EEPROM, magnetic disk drives, optical disk drives, or various combinations of these and similar devices. The linked list described below is preferably stored in the NDB 13.

The user interface is accomplished through MCDU 12 which communicates with FMC 11 and processor 11A. MCDU 12 comprises a display screen 12A, line select keys 19, and a key pad 12B. MCDU 12 are commonly used to enter enroute flight planning commands to the FMC 11 and to output enroute flight data to the pilot, crew, or operator via display screen 12A. The operation of line select keys 19 allow quick selection and deletion of displayed items. The invention preferably uses this preexisting user interface device to accomplish the user interface for ground navigation at airports, although other user interfaces may also be used to practice the invention. For example, other displays such as the EFIS 15 or HUD 14 may be used as part of the user interface if desired.

HUD 14 and EFIS 15 are shown in communication with FMC 11. HUD 14 projects an image to a combiner positioned along the forward line of sight of the pilot such that a pilot can view the image and also look out the front windshield of the aircraft simultaneously. EFIS 15 (also referred to as a HDD) is typically positioned below the front windshield of the aircraft. EFIS 15 comprises one or more display screens which are typically implemented using cathode ray tubes (CRTs), flat panel displays, or functionally similar display devices. Once a taxi plan is selected, the plan is preferably displayed to the pilot on either the HUD 14 or EFIS 15.

Several communications systems are also coupled to the FMC 11. MMR 16 receives navigation or position signals such as global positioning system (GPS) signals, differential GPS (DGPS), local area augmentation system (LAAS) signals, wide area augmentation system (WAAS) signals, and the like. These signals are communicated to the FMC 11 where the position of the aircraft relative to airport features is determined. This aircraft position information is then used to compute appropriate taxi selection options to the pilot.

Transponder 17 and CMU 18 provide additional input and output communications channels. Transponder 17, for example, may receive signals such as automatic dependent surveillance broadcast (ADS-B) from other aircraft or air traffic control (ATC). CMU 18 comprises a data link with ATC or similar controlling authority through which taxi plans and instructions are communicated, negotiated, modified, and approved or denied.

Figure 2:
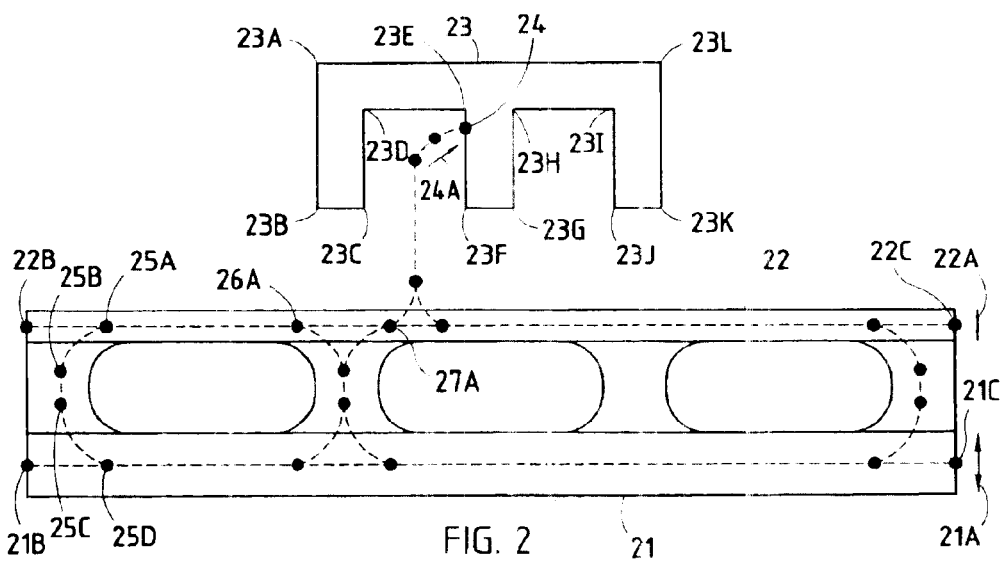
FIG. 2 is one example of an airport data representation according to the invention.

FIG. 2 illustrates an airport data representation according to the invention. Runway 21 is represented by location points 21B and 21C. The runway width 21A and elevation are determined at each of the two location points 21B and 21C, if desired. The taxiway 22 is represented by location points 22B and 22C and a taxiway width 22A. The terminal building 23 is represented by a sequence of location points 23A through 23L. The various connectors and intersections are represented by the remaining location points shown in FIG. 2. Examples of these points include 25A, 26A, and 27A as identifiers for points along taxiway 22. Gate 24 is represented by the single location point 24 and an aircraft heading 24A.

Figure 3A:
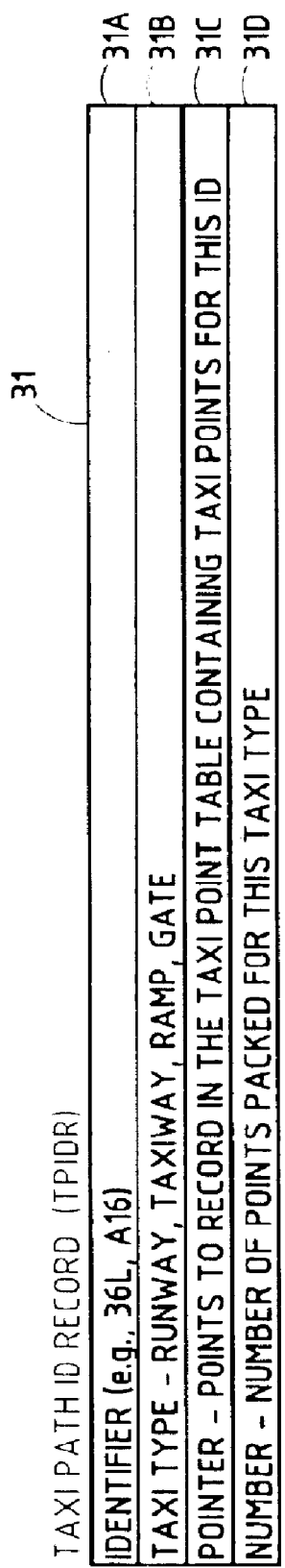
FIGS. 3A and 3B illustrate data tables comprising the linked list according to the invention.
Figure 3B:
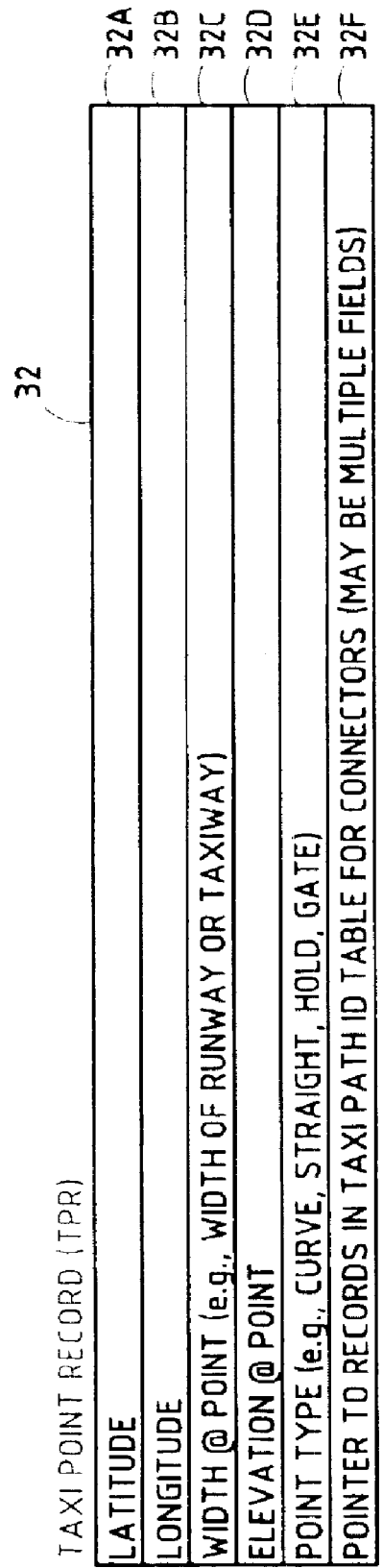
Figure 4:
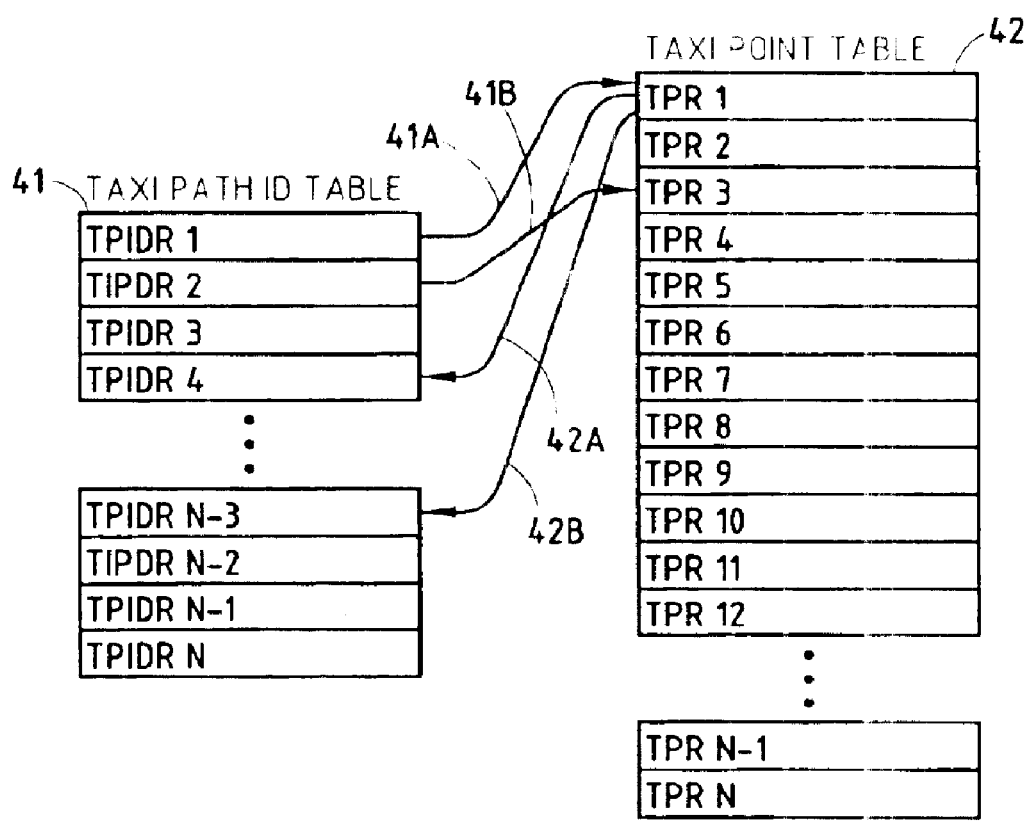
FIG. 4 illustrates a linked list according to the invention.

Another aspect of the invention is the database structure used to implement the airport map system of the invention. The database stores the airport map information for each airport. In one embodiment, the airport map data requires less than three thousand bytes of data storage space to represent the airport surface features of a single airport. A linked list is preferably used to implement the database. The linked list is illustrated in FIGS. 3A, 3B, and 4. Two tables of data are linked together. The first table is the Taxi Path ID Table (TPIDT) 41 that is comprised of Taxi Path ID Records (TPIDR) 31.

The TPIDR 31 comprises an identifier field 31A such as 36L for a runway, A16 for a gate, or L5 for a taxiway connector. The taxi type field 31B identifies the instant path as a runway, taxiway, ramp, gate, or similar airport area. Pointer field 31C is a link to a TPR in the taxi point table that contains taxi points associated for this taxi path ID. The number field 31D tells the program of the number of taxi points for this taxi ID.

The second table is the Taxi Point Table (TPT) 42 that is comprised of Taxi Point Records (TPR) 32. Each TPR 32 comprises a latitude field 32A and a longitude field 32B for precisely identifying the horizontal location of the point. A width field 32C identifies the width of the pavement at this point. The elevation field 32D contains the elevation of the point. This may be absolute elevation or a relative position relative to a reference point or monument on the airport. The point type field 32E identifies the point as to a particular characteristic. For example, as part of a curve or straight surface, a hold point, or a gate. Certain points result in specific actions. For example, a hold point causes the system to prompt the pilot to acknowledge the hold before continuing. This is preferably accomplished by halting the advancing or scrolling of the display screen until the hold is acknowledged by the pilot by actuating a line select key 19.

The taxi point record includes another link 33F, labeled the pointer to records in the TPIDT 41. This field can be comprised of multiple links. For example, if an aircraft is present on a runway, there are typically many connectors to the taxiways. Using the pointer field, the processor 11A can quickly identify the possible taxiway and connectors.

The linked list between the two tables is shown in FIG. 4. Each record in the TPIDT 41 contains a link to a record in the TPT 42. These are indicated by links 41A and 41B. Similarly, many of the records in the TPT 42 contain multiple links to records in the TPIDT 41. This is illustrated by links 42A and 42B which show two links from record TPR 1 to records TPIDR 4 and TPIDR N-3.

The use of the linked list structure allows the invention to quickly identify appropriate taxi options and allows a pilot to quickly build a taxi plan comprising the taxi points in the NDB 13.

The method of the invention follows from the description of the structure of the database. The method begins with the runways, taxiways, and gates since these are important elements of an airport map. First, two runway location points for representing the centerline of each runway of the airport are determined. Preferably these two points represent each end of the runway. The width of the runway is also determined. Using these three pieces of data in a runway can be defined, including the edges. Each location point is representative of the latitude and longitude coordinates of the selected points on the runway. Other position identifying coordinates may also be used as long as the two points on the runway are determined with certainty and sufficient accuracy.

Each of the runway location points is stored in a taxi point record or similar record. The width of the runway is also stored in at least one of the taxi point records along with the location points.

An identifier for the runway is stored in a taxi path ID record. The identifier is preferably the same as the conventional identifier used at the airport (e.g., 27L or 27R). Similarly, the identifiers for the taxiways, connectors, intersections, and gates also use their familiar identifiers. However, this is not required to practice the invention. A pointer is stored in the taxi path ID record indicating the location of the associated taxi point records. Each runway and taxiway are determined and stored in the database in a similar fashion. In this manner, the physical dimensions of every runway and taxiway are quickly found.

Other airport facilities are stored in a similar compact manner. Some are stored in slightly different formats as can be deduced from the discussion above. For example, gates are defined by only one location point and, optionally, one heading value. Consequently, gate information is stored in only one taxi point record and the aircraft heading may be stored in the width field of the record. However, the gate information is still stored in the linked list structure. The gate identifier and a pointer are stored in a taxi path ID record similar to the taxi path ID record for the runways and taxiways.

In a similar manner, airport structures, buildings, ramp areas and the like are represented as a sequence of location points that represent the perimeter of the structure. The location points are stored in a sequence of taxi point records and the associated identifier is stored into a taxi path ID record along with a pointer to the taxi point records.

In addition to the location points discussed above, additional data for each airport facility may also be stored in the linked list without departing from the invention. For example, in one embodiment the elevation for each location point is also determined and stored in the taxi point record. Other information relevant to a particular location point may also be stored in the taxi point record. For example, if the point is a hold or yield location on the airport, this information may be stored in the taxi point record.

It will become apparent to those skilled in the art that various modifications to the preferred embodiment of the invention as described herein can be made without departing from the spirit or scope of the invention as defined by the appended claims.

The invention claimed is:

1. An airport map system comprising:
   a display screen suitable for displaying a map of an airport;
   a data storage unit for storing airport map data representative of airport surface features comprising runways and taxiways, wherein runways are defined in said airport map data by two location data points and a width value; and
   a processor in communication with said display screen and said data storage unit.

2. The airport map system of claim 1, wherein said airport map data comprises runway data that includes one location point at each end of the runway.

3. The airport map system of claim 2, wherein said surface features comprise buildings and each of said buildings are defined by a sequence of location points that represent the outline of said buildings.

4. The airport map system of claim 3, wherein said location points are representative of latitude and longitude coordinates.

5. The airport map system of claim 1, wherein said runways are represented by runway data, and said runway data comprises two location points that define a centerline of a runway.

6. The airport map system of claim 1, wherein said taxiways are represented by taxiway data, and said taxiways are defined by two location points that define the centerline of the taxiway.

7. The airport map system of claim 1, wherein said surface features comprise ramp areas and wherein said ramp areas are represented by ramp data, said ramp data defined by a sequence of location points that define the outline of said ramp area.

8. The airport map system of claim 1, wherein said surface features comprise a hold and yield data and said hold and said yield data are defined by a single location point.

9. The airport map system of claim 1, wherein said surface features comprise gate data and said gate data is defined by a single location point and a desired aircraft heading.

10. The airport map system of claim 1, wherein said airport map data is stored in a linked list.

11. The airport map system of claim 10, wherein said linked list comprises a taxi path ID record comprising a pointer to a taxi point record.

12. The airport map system of claim 1, wherein the taxiways are defined in said airport map data by two location points and a width value.

13. The airport map system of claim 1, wherein said airport surface features comprise arc transitions, and wherein each of said arc transitions are defined in said airport map data by two location data points, a width value, and a radius of the arc transition.

14. The airport map system of claim 1, wherein the airport map data comprises data defining straight and arc shaped travel ways, wherein the straight travel ways are defined by two location data points and a width value, and the arc travel ways are defined by two location data points, a width value, and an arc radius.

15. The airport map system of claim 1, wherein said airport map data requires less than three thousand bytes of data storage space to represent said airport surface features of a single airport.

16. A method of storing data representative of airport surface features comprising the steps of:
   determining two runway location points defining the centerline for a runway;
   determining a runway width value for said runway;
   storing said two runway location points and said runway width value in at least one taxi point record; and
   storing an identifier for said runway and a first pointer in a first taxi path ID record, said first pointer indicating the address of said taxi point records containing said runway location points.

17. The method of storing data of claim 16 further comprising the steps of:
   determining two taxiway location points defining the centerline for a taxiway;
   determining a taxiway width value for said taxiway;
   storing said two taxiway location points and said taxiway width value in at least one taxi point record; and
   storing an identifier for said taxiway and a second pointer in a second taxi path ID record, said second pointer indicating the address of said taxi point records containing said taxiway location points.

18. The method of storing data of claim 16 further comprising the steps of:
   determining a sequence of location points representative of the parameter of a structure;
   storing said sequence of location points in a plurality of taxi point records; and
   storing a structure identifier for said structure and a third pointer into a third taxi path ID record, said third pointer indicating the address of one of said plurality of taxi point records.

19. The method of storing data of claim 16 further comprising the steps of:
   determining a gate location point representative of the location of a gate;
   determining a desired aircraft heading for said gate;
   storing said gate location point in a first taxi point record;
   storing said desired aircraft heading in said second taxi point record; and storing a gate identifier for said gate and a fourth pointer into a fourth taxi path ID record, said fourth pointer indicating the address of said first and second taxi point record.

20. The method of storing data of claim 16 further comprising the steps of:
   determining two location data points defining an arc transition;
   determining a radius of the arc transition;
   determining a width value of the arc transition;
   storing said location points, width value, and radius of the arc transition in at least one taxi point record; and
   storing an identifier for said arc transition in a third pointer at a third taxi path ID record, said third pointer indicating the address of said arc transition records containing said arc transition location points.

21. An airport map system comprising:
   a display screen suitable for displaying a map of an airport;
   a data storage unit for storing airport map data representative of airport surface features comprising runways and taxiways, wherein the airport map data comprises data defining straight and arc shaped taxiways, wherein the straight taxiways are defined by two location data points and a width value, and an arc radius; and
   a processor in communication with said display screen and said data storage unit.

22. The airport map system of claim 21, wherein the runways are defined in said airport map data by two location data points and a width value.

* * * * *

UNITED STATES PATENT AND TRADEMARK OFFICE
CERTIFICATE OF CORRECTION

PATENT NO. : 6,862,519 B2
DATED : March 1, 2005
INVENTOR(S) : Randy L. Walter

It is certified that error appears in the above-identified patent and that said Letters Patent is hereby corrected as shown below:

Column 8,
Line 49, before "an" insert -- the arc shaped taxiways are defined by two location data points, a width value, and --.

Signed and Sealed this

Seventh Day of June, 2005

JON W. DUDAS
*Director of the United States Patent and Trademark Office*